(12) United States Patent
Fink et al.

(10) Patent No.: US 6,926,093 B1
(45) Date of Patent: Aug. 9, 2005

(54) MECHANISM FOR MOUNTING A SOIL LEVELING DEVICE

(75) Inventors: Jerome Thomas Fink, Hutchinson, KS (US); Rodney Lee Hagman, Buhler, KS (US)

(73) Assignee: Krause Plow Corporation, Inc., Hutchinson, KS (US)

( * ) Notice: Subject to any disclaimer, the term of this patent is extended or adjusted under 35 U.S.C. 154(b) by 0 days.

(21) Appl. No.: 10/645,001

(22) Filed: Aug. 21, 2003

(51) Int. Cl.$^7$ .............................................. A01B 35/24
(52) U.S. Cl. ...................................... 172/705; 172/261
(58) Field of Search ............................... 172/261, 264, 172/265–268, 705, 707, 708, 763

(56) References Cited

U.S. PATENT DOCUMENTS

| | | | | |
|---|---|---|---|---|
| 4,068,723 A | * | 1/1978 | Quanbeck | 172/267 |
| 4,128,130 A | * | 12/1978 | Green et al. | 172/266 |
| 4,193,456 A | * | 3/1980 | Ankenman | 172/272 |
| 4,210,210 A | * | 7/1980 | Ankenman | 172/272 |
| 4,342,366 A | * | 8/1982 | Schenk et al. | 172/643 |
| 4,418,761 A | | 12/1983 | Dietrich, Sr. et al. | |
| 4,463,813 A | * | 8/1984 | Long et al. | 172/705 |
| 4,532,790 A | * | 8/1985 | Nicholls | 172/266 |
| 4,548,277 A | * | 10/1985 | Dietrich et al. | 172/265 |
| 4,609,051 A | * | 9/1986 | Good | 172/266 |
| 4,700,785 A | * | 10/1987 | Bartusek et al. | 172/705 |
| 6,105,680 A | * | 8/2000 | High | 172/264 |
| 6,681,868 B2 | | 1/2004 | Kovach et al. | |
| 2003/0141088 A1 | | 7/2003 | Kovach et al. | |

OTHER PUBLICATIONS p. 4 from Krause Plow Corporation's Operating Instructions dated Oct. 2000 showing assigne's prior reel mechanism. See note 4 in upper right.

pp. 8 and 9 from a DMI owner's manual dated Feb. 2001. Attention is directed to the Figure on p. 8 and Figures 2 and 3 on p. 9.
Exerpt from literature by Wil-Rich Manufacturing of Wahpeton, ND showing a basket assembly having a quick release mechanism. Date believed to be prior to Aug. 21, 2002.
Advertixing literature by Remlinger Mfg. Co., showing basket assembly with "spring adjustable arms", Apparatus shown believed to be on sale prior to Aug. 21, 2002.
Great Plains Mfg., Inc. Brochure, p. 17, Believed to be dated Aug. 2001, See picture at lower right of "spring loaded reel".
John Deere sales brochure entitled Seedbed Tillage believed to be published in Oct. of 2001, p. 23. See "3-bar spike-tooth harrow with rolling basket" at top of page.

\* cited by examiner

*Primary Examiner*—Thomas B. Will
*Assistant Examiner*—Alexandra Pechhold

(57) ABSTRACT

A mechanism for mounting a soil leveling device to the mounting arm of a leveling attachment operates in either a fixed setting or a floating setting. The mechanism includes a rearwardly extending carrier arm which carries the soil leveling device at its distal end. The carrier arm is pivotably connected at its proximal end to the mounting arm of the leveling attachment for upward and downward movement. A connecting link is mounted to the mounting arm and a spring assembly extends between the link and the carrier arm. The connecting link is selectively operable in either a fixed setting or a released, floating setting. When the connecting link is in the fixed setting, the spring assembly biases the carrier arm and the leveling device with a downward force. When the connecting link is in the floating setting, the leveling device can move across a soil surface free of a downward bias from the spring assembly.

11 Claims, 7 Drawing Sheets

MECHANISM FOR MOUNTING A SOIL LEVELING DEVICE

FIELD OF THE INVENTION

This invention relates to a mechanism for mounting a soil leveling device to a leveling attachment.

BACKGROUND OF THE INVENTION

A field cultivator in combination with a leveling attachment is used to disrupt, loosen and finally level soil in preparation for planting. Leveling attachments often include a rolling basket or reel and are typically mounted to a mounting arm at the trailing end of a field cultivator by a pivoting carrier arm. A reel typically includes a pattern of transverse, radially spaced ribs carried by generally circular plates which rotate about an axis. Such leveling devices are normally operated in a lowered position and typically include fixed down pressure spring mountings which press down on the leveling device as it moves across the ground. Fixed down pressure spring mountings work well in dry soil conditions where dry, hard clods are present. Under down pressure, the reel penetrates slightly below the soil surface, breaks up the dry hard clods or pushes them beneath the surface. During dry soil conditions, the reel does not become clogged. However, in wet conditions, the down pressure is not needed to break up relatively wet clods and the penetrating reel under down pressure tends to clog with mud. In other soil conditions, it is possible to work the soil too finely, in such cases it would also be advantageous to have a reel that applies less down pressure.

BRIEF DESCRIPTION OF THE INVENTION

In an embodiment of the present invention the aforementioned problem is addressed by providing a floating mechanism for mounting a leveling device such as a reel to the leveling attachment. The floating mechanism has a fixed setting and a floating setting. When in the fixed setting, the reel is biased to penetrate the soil surface. When in the floating setting, the reel is not biased to penetrate the soil surface but is free to roll along the top of the soil surface. When the mechanism is in the floating setting, the reel does not accumulate wet soil during wet conditions and even spins faster to better release wet soil.

The floating mechanism includes a rearwardly extending carrier arm which supports the leveling device at its distal end and which is pivotably connected at its proximal end to the mounting arm of the leveling attachment. The carrier arm pivots between a lowered position in which the soil leveling device may penetrate the soil surface and a raised position in which the soil leveling device is raised above the lowered position. A connecting link is mounted to the mounting arm of the leveling attachment and a spring assembly extends between the link and the carrier arm. The connecting link is selectively operable in either a fixed setting or a floating setting. When the connecting link is in the fixed setting, the spring assembly biases the carrier arm with a downward force. When the connecting link is in the floating setting, the connecting link is free to move so that the leveling device can swing upwardly free of bias from the spring assembly.

DETAILED DESCRIPTION

Figure 1:
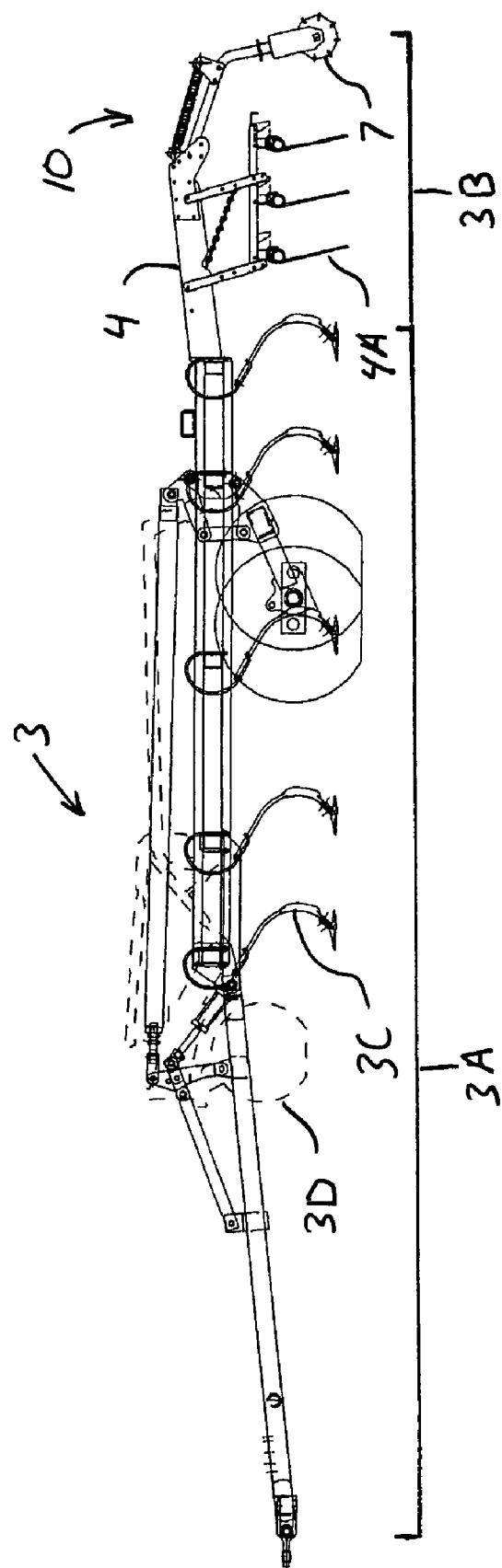
FIG. 1 is a side view of a field cultivator combined with a leveling attachment including a rear mounted soil leveling device.

Turning now to the drawings, wherein like reference numerals identify identical or corresponding elements, and more particularly to FIG. 1 thereof, a floating mechanism 10 is shown connecting between a mounting arm 4 of a leveling attachment 3B and a soil leveling device 7. The arrangement shown in FIG. 1 includes a field cultivator 3A and a leveling attachment 3B. In this example, field cultivator 3A includes a pattern of shanks 3C and an optional pattern of discs 3D shown in phantom. Also, in this example, leveling attachment 3B is mounted to field cultivator 3A by mounting arm 4 which also supports a pattern of spring loaded tines 4A. Soil leveling device 7 is attached to the trailing end of mounting arm 4 by floating mechanism 10.

Figure 2:
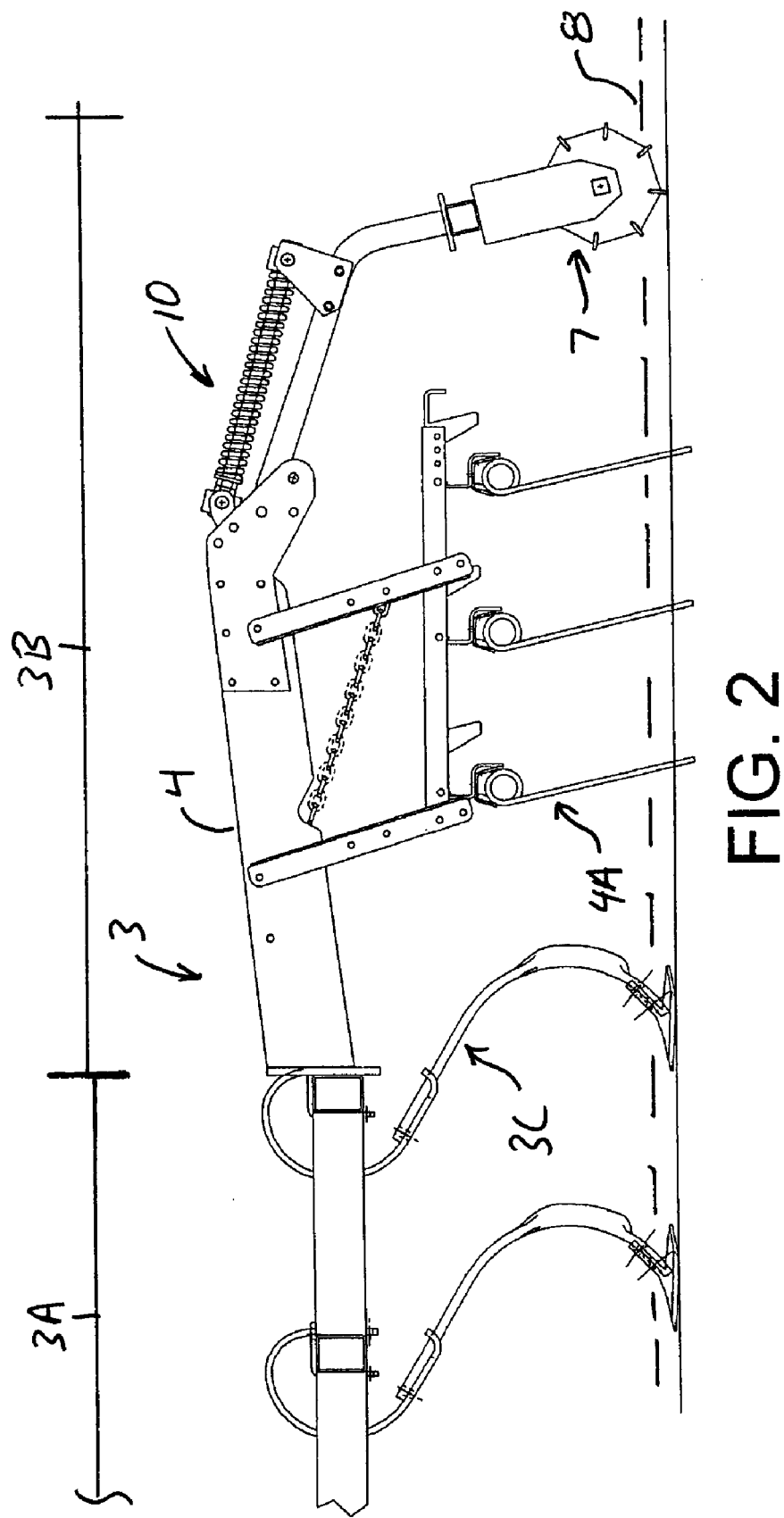
FIG. 2 is a side view of the rear portion of the field cultivator and leveling attachment shown in FIG. 1.
Figure 3:
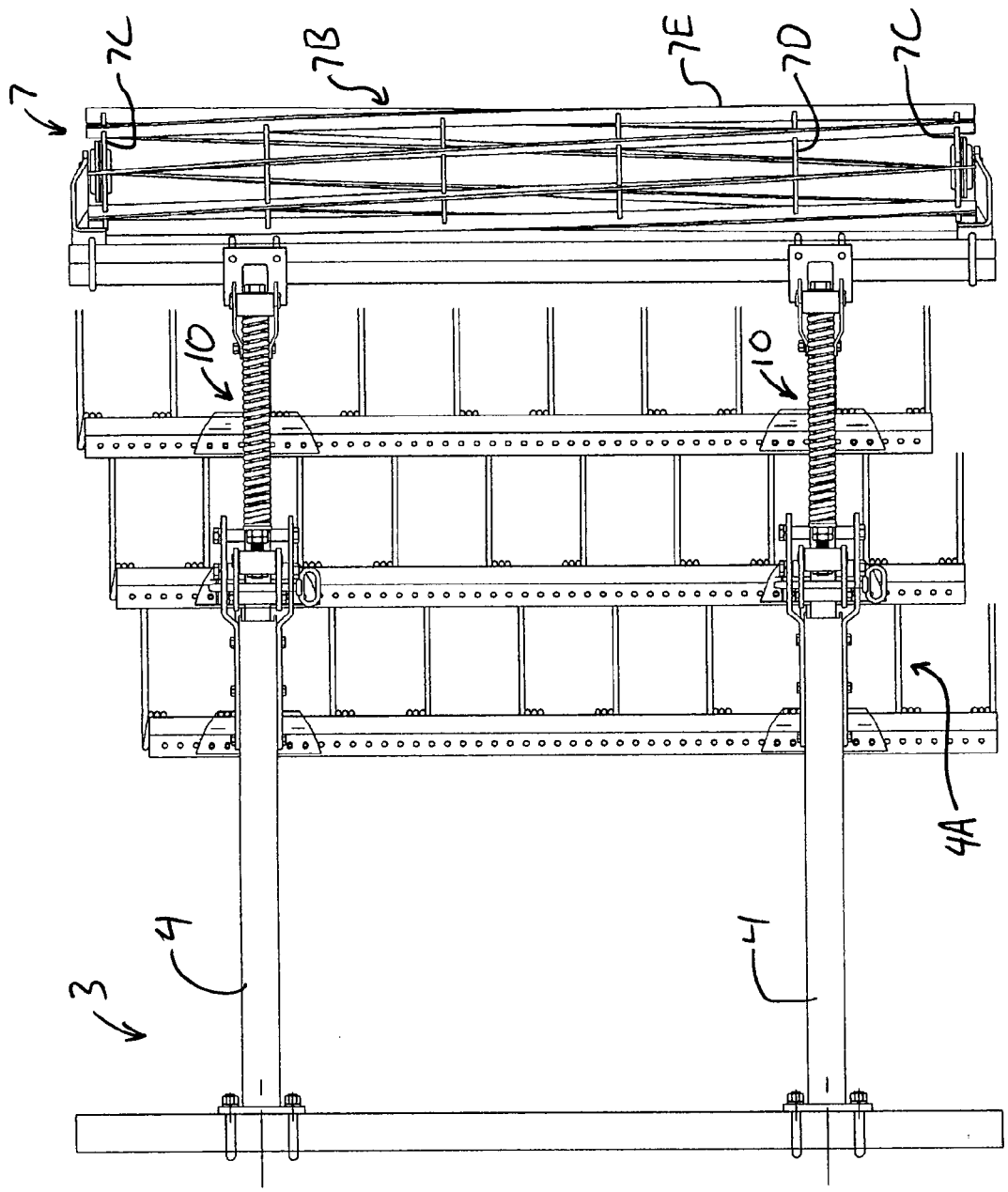
FIG. 3 is a top view of rear portion of the field cultivator and leveling attachment shown in FIG. 2.

FIG. 2 provides a close up view which shows the trailing end of field cultivator 3A and leveling attachment 3B in relation to soil surface 8. FIG. 3 is a top view of the structures illustrated in FIG. 2. FIG. 3 illustrates that, in this example, soil leveling device 7 is a reel used for smoothing soil surfaces. Soil leveling device 7 includes a reel support member 7A, a reel 7B which further includes end plates 7C, support plates 7D and transverse ribs 7E. As can be seen in FIG. 3, soil leveling device 7 is supported at two locations by two substantially identical floating mechanisms 10. Those skilled in the art will appreciate that the structures presented in FIGS. 2 and 3 may be repeated in a side by side fashion to devise an extensive apparatus for cultivating and leveling soil.

Figure 4:
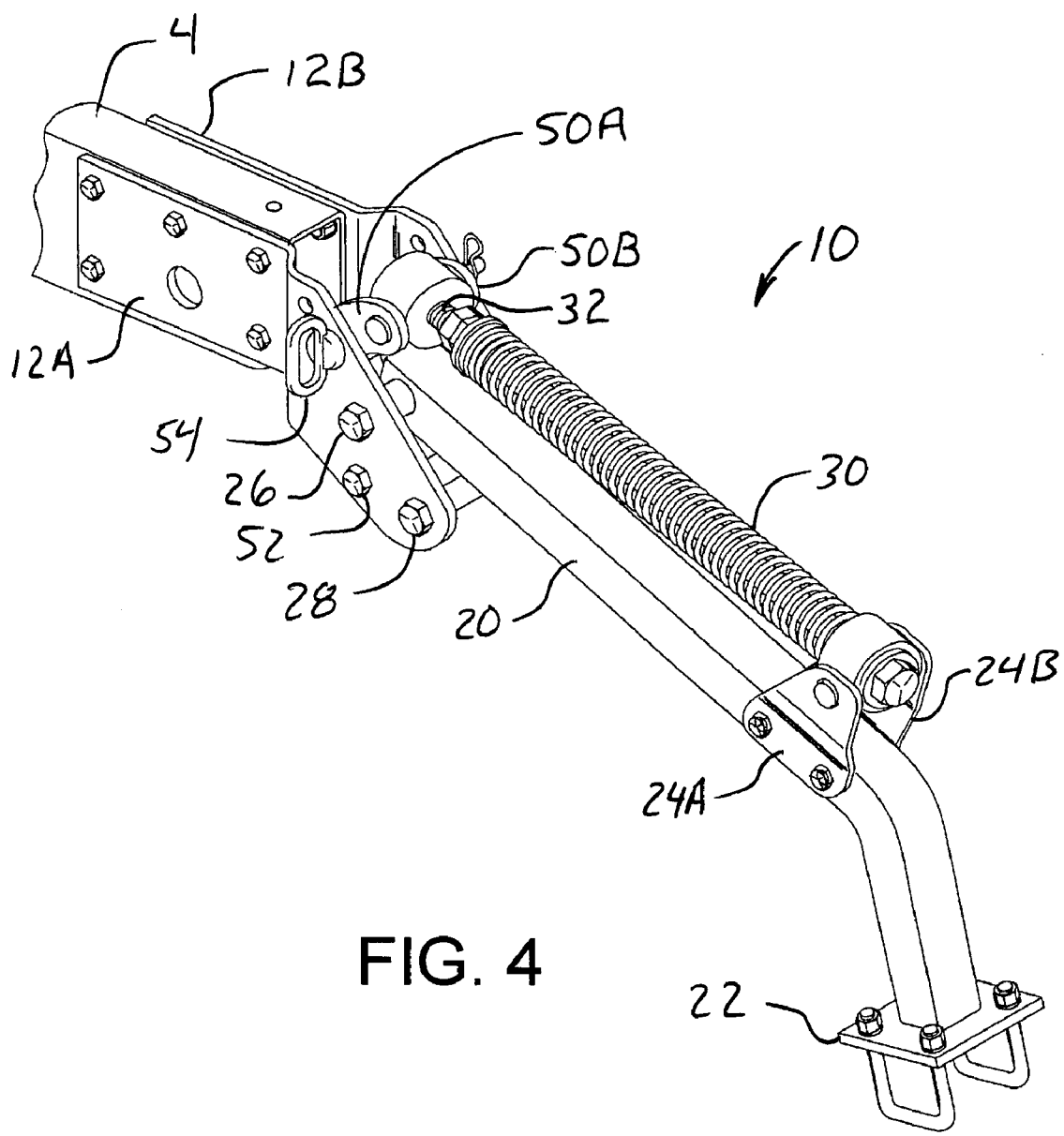
FIG. 4 is an perspective view of the floating mechanism.

FIGS. 4–8B show a floating mechanism 10 in accordance with an embodiment of the present invention. FIG. 4 shows that floating mechanism 10 includes left and right mounting plates 12A and 12B, carrier arm 20, lugs 24A and 24B, a spring assembly 30 and connecting links 50A and 50B. As can be best seen in FIG. 4, left and right mounting plates 12A and 12B are fixed to mounting arm 4 of leveling attachment 3B and should be understood as physical extensions of mounting arm 4.

Figure 5:
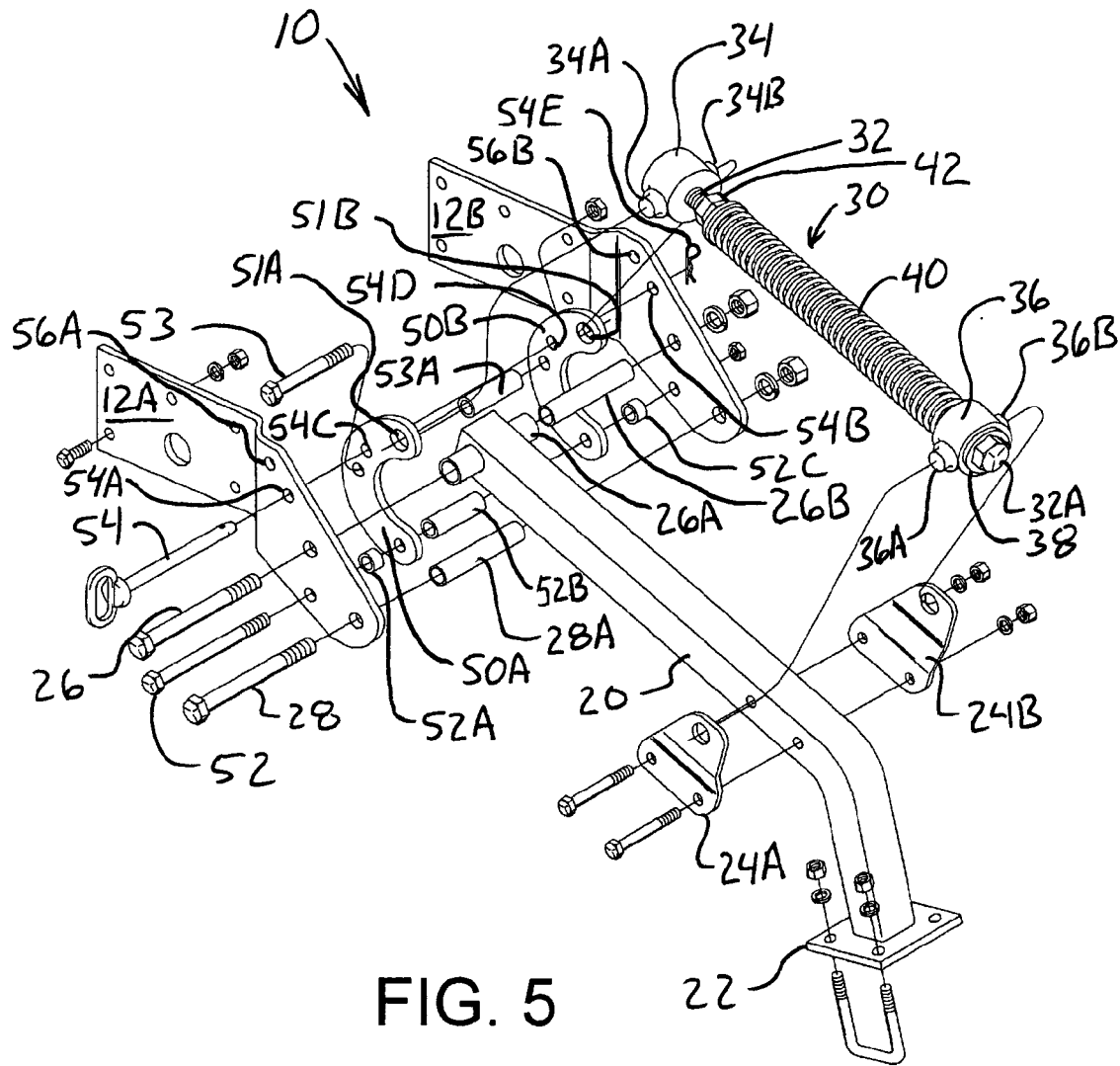
FIG. 5 is an exploded perspective view of the floating mechanism.

The details associated with carrier arm 20 can be best understood by referring to FIG. 5. Carrier arm 20 is mounted to left and right mounting plates 12A and 12B by a carrier arm mounting bolt 26 which passes through corresponding holes in left and right mounting plates 12A and 12B and carrier arm 20. Carrier arm 20 includes a spacer sleeve 26A which locates carrier arm 20 in a transverse direction. Spacer sleeve 26A receives a bushing 26B which in turn receives mounting bolt 26. Stop bolt 28 which carries a sleeve 28A limits the downward movement of carrier arm 20 (or the clockwise movement of carrier arm 20 as seen in FIG. 5). At the distal end of carrier arm 20 is a mounting plate 22 for mounting a leveling device such as leveling device or reel 7 shown in FIGS. 2 and 3.

Figure 7:
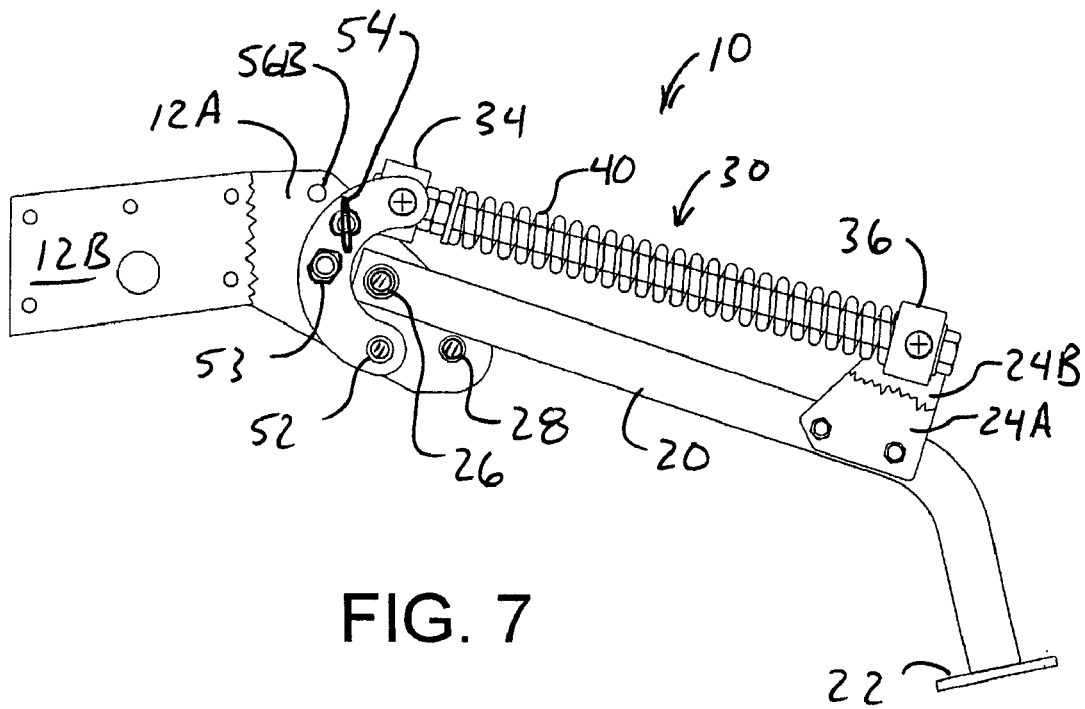
FIG. 7 a partially sectioned side view of the floating mechanism taken from plane 7—7 of FIG. 6.

Spring assembly 30 is a spring member which biases carrier arm 20 in the position shown in FIGS. 4 and 7. Spring assembly 30 is shown most clearly in FIG. 5. FIG. 5 shows that spring assembly 30 includes a rod 32 having a head 32A at its distal end, a fixed trunnion fitting 34 at the proximal end of rod 32, a sliding trunnion fitting 36 at the distal end of rod 32, a retaining washer 38 at the distal end of rod 32 and a spring retaining nut 42 located toward fixed trunnion fitting 34. A spring 40 biases sliding trunnion fitting 36 away from retaining nut 42 and against retaining washer 38. In this embodiment, spring 40 is preferably compressed slightly or pre-loaded when in the position shown in FIGS. 4 and 7 and therefore resists trunnion fitting 36 with an initial force. Spring assembly 30 is arranged relative to carrier arm 20 such that spring 40 compresses slightly when carrier arm 20 initially pivots away from stop bolt 28. Spring assembly 30 is also arranged relative to carrier arm 20 such that spring 40 is compressed by a substantially constant amount as carrier arm 20 pivots away from stop bolt 28 thereby providing a substantially constant amount of down pressure. The initial deflection and therefore the initial resisting force of spring 40 can be adjusted by moving retaining nut 42 toward or away from fixed trunnion fitting 34.

Spring assembly 30 is mounted to carrier arm 20 at its distal end by right and left lugs 24A and 24B which have holes for receiving a pair of bosses 36A and 36B extending from opposite sides of sliding trunnion fitting 36. Spring assembly 30 is mounted to right and left mounting plates 12A and 12B at its proximate end by a connecting link including left and right links 50A and 50B. Links 50A and 50B also have holes for receiving a pair of bosses 34A and 34B extending from opposite sides of fixed trunnion fitting 34.

Links 50A and 50B are bolted together and held in a spaced relationship by a transverse bolt 53 and spacer 53A such that they act as a single connecting link between mounting arm 4 and spring assembly 30. Links 50A and 50B each have connecting end portions where holes 51A and 51B receive bosses 34A and 34B of fixed trunnion fitting 34. Links 50A and 50B also include pivoting end portions where they are mounted to left and right mounting plates 12A and 12B and thus, by extension, to mounting arm 4 by a link bolt 52. A set of spacers including left, center and right spacers 52A, 52B and 52C maintain the proper transverse spacing of connecting links 50A and 50B on link bolt 52.

Links 50A and 50B can be arranged in either a fixed setting or a floating setting. Links 50A and 50B can be arranged in a fixed setting by inserting a locking pin 54 through holes 54A and 54B in mounting plates 12A and 12B and holes 54C and 54D in links 50A and 50B. A cotter key 54E should be inserted at the end of locking pin 54 to secure locking pin 54. When links 50A and 50B are in the fixed setting, carrier arm 20 encounters the biasing force of spring 40 as it lifts away from stop bolt 28. This increases the down pressure on carrier arm 20 and any soil leveling device that may be attached to carrier arm 20. Links 50A and 50B can be arranged in a floating setting by inserting a locking pin 54 through holes 56A and 56B in mounting plates 12A and 12B instead of through the holes described above. When links 50A and 50B are in the floating setting, they are free to rotate about link bolt 52 until they encounter lock pin 54. When links 50A and 50B are in the floating setting, carrier arm 20 does not encounter resistance from spring 40 as it rotates away from stop bolt 28 until links 50A and 50B encounter locking pin 54. This limits the down pressure on carrier arm 20 and any soil leveling device that may be attached to carrier arm 20 to the weight of leveling device 7 and portions of the weight of carrier arm 20 and spring assembly 30 until links 50A and 50B encounter lock pin 54. In the present example, when mechanism 10 is in the floating setting, reel 7 shown in FIG. 3 has a down pressure corresponding to the weight of reel 7 and the portions of the weights of the various supporting structures associating with reel 7. Reel 7 is normally positioned such that carrier arm 20 is slightly raised from stop bolt 28. Accordingly, when mechanism 10 is in the fixed position, reel 7 is subjected to the additional force applied by spring assembly 30.

Figure 6:
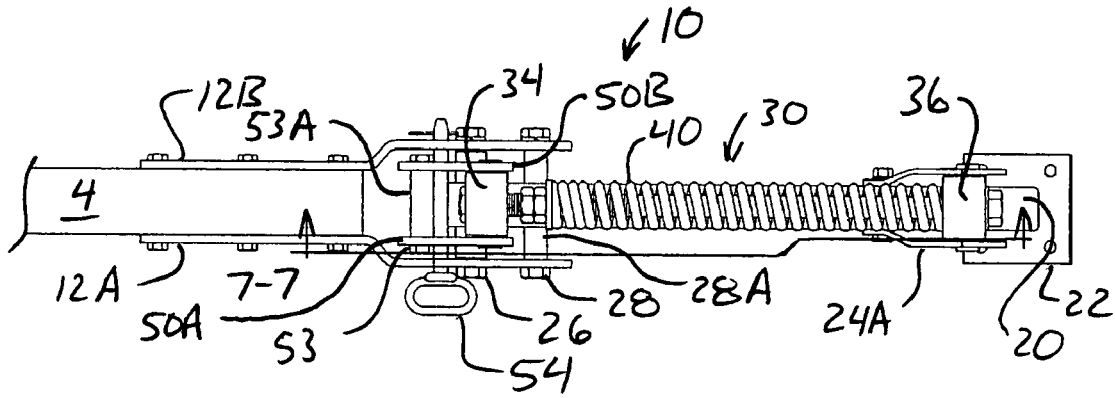
FIG. 6 a top view of the floating mechanism shown in the fixed setting.
Figure 8A:
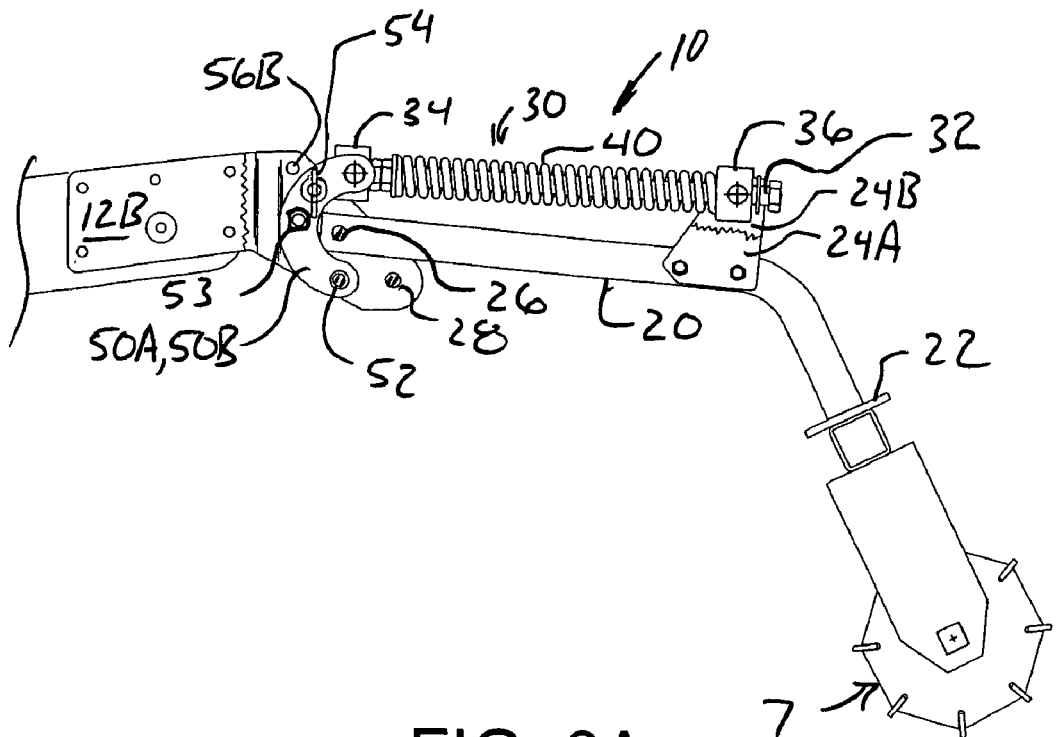
FIG. 8A a partially sectioned side view of the floating mechanism shown with the linkage in the fixed setting and with the carrier arm raised.
Figure 8B:
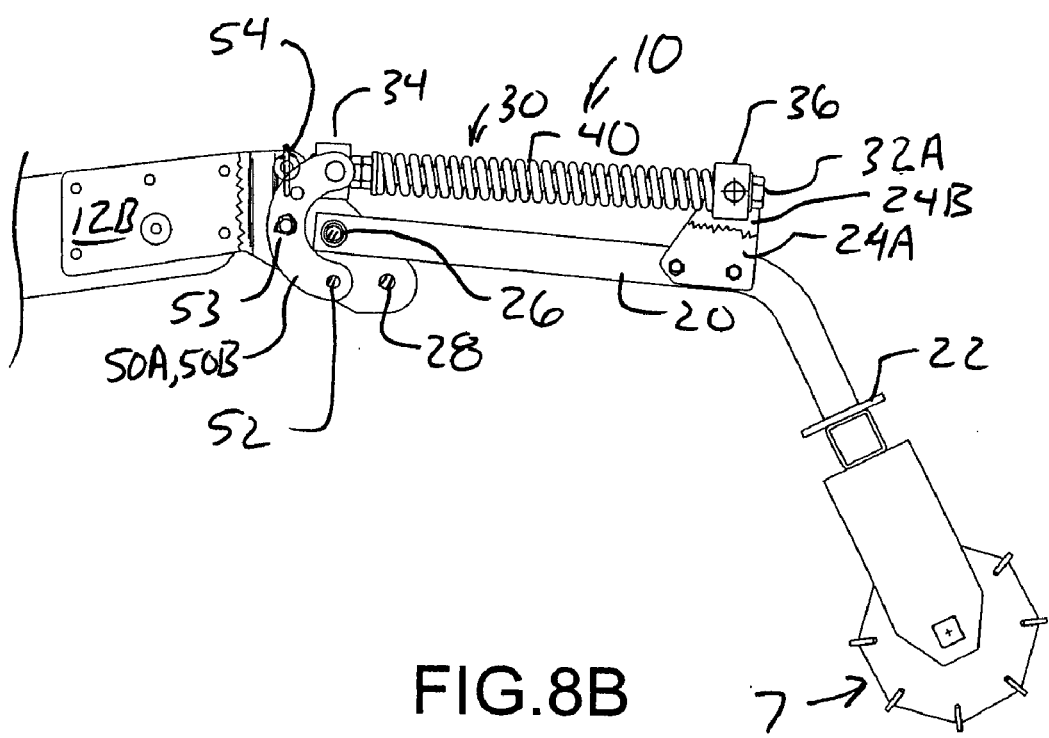
FIG. 8B a partially sectioned side view of the floating mechanism shown with the linkage in the floating setting and with the carrier arm raised.

FIG. 6 provides a top view of the assembled floating mechanism 10 while FIG. 7 is a cross section taken from plane 7—7 of FIG. 6. In FIGS. 7, 8A and 8B, bolts cut by plane 7—7 are indicated in cross section. However, pin 54 is shown in full view in FIGS. 7, 8A and 8B for clarity. FIGS. 7, 8A and 8B show the three basic positions of floating mechanism 10. In FIG. 7, mechanism 10 is in a fixed setting and in the lowered position. In FIG. 7, pin 54 is inserted through holes 54A and 54B and carrier arm 20 is resting against stop bolt 28. In FIG. 8A, mechanism 10 is in the fixed setting and in the raised position. In FIG. 8A, pin 54 is still inserted through holes 54A and 54B. However, in FIG. 8A, carrier arm 20 is raised. Since connecting links 50A and 50B are fixed in FIG. 8A, the upward pivoting movement of carrier arm 20 causes sliding trunnion fitting 36 to compress spring 40, thereby biasing carrier arm 20 toward the lowered position. FIG. 8A is drawn to show the full range of motion of carrier arm 20. Yet, during actual operation, carrier arm 20 would generally not raise into the position shown in FIG. 8A. Rather, the biasing force of spring assembly 30 would press reel 7 to penetrate soil surface 8 as shown in FIG. 2. When mechanism 10 is in the fixed setting, reel 7 would either break up clods of soil or push them beneath the surface.

In FIG. 8B, mechanism 10 is in the floating setting and in the raised position. In FIG. 8B, pin 54 has been removed from holes 54A and 54B and inserted through holes 56A and 56B. In FIG. 8B, carrier arm 20 is also raised. Since connecting links 50A and 50B are free to rotate about pivot bolt 52 in FIG. 8B, the upward pivoting movement of carrier arm 20 does not cause sliding trunnion fitting 36 to compress spring 40 because fixed trunnion fitting 34 is free to move. Accordingly, in FIG. 8B, carrier arm 20 is not biased by spring assembly 30 toward the lower position. Carrier arm 20 is biased by spring assembly 30 toward the lower position if carrier arm 20 is further rotated counter clockwise past the position shown in FIG. 8B such that pin 54 stops the movement of connecting links 50A and 50B. FIG. 8B is drawn to show the full range of motion of carrier arm 20. Yet, during actual operation, carrier arm 20 would generally not raise into the position shown in FIG. 8B. Rather, the weight of reel 7 and some of the weight of the structures connected to reel 7 would press upon reel 7 with less force than when spring assembly 30 biases carrier arm 20. When carrier arm 20 is not biased by spring assembly 30, reel 7 rides on top of soil surface 8 in a position slightly elevated from that shown in FIG. 2.

Although in this example, a link is used to complete a mechanical connection between mounting arm 4 and spring assembly 30, it would also be possible to interpose such a link between spring assembly 30 and carrier arm 20. Moreover, in this example, a pivoting linkage is used to provide floating connection for mounting one end of spring assembly 30. Such a pivoting linkage could be replaced by another type of link such as for example a sliding or reciprocating link which would also include a means for locking the link in a fixed setting or a releasing the link to a floating setting.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. In combination with a mounting arm of a soil leveling attachment:
    a rearwardly extending carrier arm having proximal and distal end portions, said distal end portion being provided with a leveling device for engagement with the ground,
    a pivot mounting said proximal end portion of said carrier arm to said mounting arm for upward and downward pivotal movement of said carrier arm,
    a selectively operable connecting link on said mounting arm having a pivoting end portion pivotably mounted to said mounting arm and a connecting end portion, said connecting link having a fixed setting and a released, floating setting in which the connecting link is movable,
    a spring member acting between said connecting end portion of said connecting link and said carrier arm to bias said carrier arm toward a lower position when said connecting link is at its fixed setting, whereby said spring member applies a downward force on said leveling device,
    a removable pin for securing said connecting link against pivoting movement relative to said mounting arm, said removable pin also removable for releasing said connecting link from said fixed setting to permit said connecting link to float in response to upward movement of said carrier arm.

2. The apparatus of claim 1 wherein:
    said spring member is biased toward an extended position and is movable between said extended position and a compressed position.

3. The apparatus of claim 1 wherein:
    said spring member is a spring assembly including a rod having a proximal end and a distal end, a fixed trunnion fitting at said proximal end of said rod and a sliding trunnion fitting at said distal end of said rod, a spring disposed between said fixed and sliding trunnion fittings biasing said sliding trunnion fitting away from said fixed trunnion fitting and a head at said distal end of said rod to retain said sliding trunnion fitting, said sliding trunnion fitting pivotably mounted to said carrier arm by lugs.

4. The apparatus of claim 1 wherein:
    said spring member is a spring assembly including a rod having a proximal end and a distal end, a fixed trunnion fitting at said proximal end of said rod and a sliding trunnion fitting at said distal end of said rod, a spring disposed between said fixed and sliding trunnion fittings biasing said sliding trunnion fitting away from said fixed trunnion fitting and a head at said distal end of said rod to retain said sliding trunnion fitting, said sliding trunnion fitting pivotably mounted to said carrier arm by lugs, said fixed trunnion fitting having a pair of bosses, and,
    said connecting link includes a pair of links each having a pivoting end portion pivotably mounted to said mounting arm, a connecting end portion for receiving one of said bosses of said fixed trunnion fitting and a removable pin for securing said links against pivoting movement relative to said mounting arm, whereby said means for releasing said connecting link from said fixed setting is the removal of said removable pin.

5. In combination with a mounting arm of a soil leveling attachment:
    a rearwardly extending carrier arm having proximal and distal end portions, said distal end portion being provided with a leveling device for engagement with the ground,
    a pivot mounting said proximal end portion of said carrier arm to said mounting arm for upward and downward pivotal movement of the carrier arm as the soil leveling device travels over the ground,
    a selectively operable connecting link on said mounting arm having a fixed setting and a released, floating setting in which said connecting link may pivot, said connecting link having a pivoting end portion pivotably mounted to said mounting arm and a connecting end portion,
    a spring member biased toward an extended position and movable between said extended position and a compressed position acting between said connecting end portion of said connecting link and said carrier arm to bias said carrier arm toward a lower position when said connecting link is in its fixed setting, whereby said spring member applies a downward force on said leveling device,
    means for releasing said connecting link from said fixed setting including a removable pin for securing said connecting link against pivoting movement relative to said mounting arm such that when said removable pin is removed, said connecting link floats in response to upward movement of said carrier arm, whereby said leveling device can travel across the ground free of downward force from said spring member.

6. The apparatus of claim 5 wherein:
    said spring member is a spring assembly including a rod having a proximal end and a distal end, a fixed trunnion fitting at said proximal end of said rod and a sliding trunnion fitting at said distal end of said rod for sliding between an extended position and a compressed position, a spring disposed between said fixed and sliding trunnion fittings biasing said sliding trunnion fitting away from said fixed trunnion fitting in said extended position and a head at said distal end of said rod to retain said sliding trunnion fitting in said extended position, said sliding trunnion fitting pivotably mounted to said carrier arm by lugs, said fixed trunnion fitting having a pair of bosses, and,
    said connecting link includes a pair of links each having a pivoting end portion pivotably mounted to said mounting arm and a connecting end portion for receiving one of said bosses of said fixed trunnion.

7. The apparatus of claim 5 wherein:
    said spring member is a spring assembly including a rod having a proximal end and a distal end, a fixed trunnion fitting at said proximal end of said rod and a sliding trunnion fitting at said distal end of said rod for sliding between an extended position and a compressed position, a spring disposed between said fixed and sliding trunnion fittings biasing said sliding trunnion fitting away from said fixed trunnion fitting in said extended position and a head at said distal end of said rod to retain said sliding trunnion fitting in said extended position, said sliding trunnion fitting pivotably mounted to said carrier arm by lugs, said fixed trunnion fitting having a pair of bosses, and, said connecting link is a pivoting link including a pair of links each having a pivoting end portion pivotably mounted to said mounting arm and a connecting end portion for receiving one of said bosses of said fixed trunnion fitting, said connecting link including a removable pin for securing said pair of links against pivoting movement relative to said mounting arm.

8. The apparatus of claim 5 further comprising:

means for limiting movement of said connecting link when said connecting link is in the released, floating setting.

9. The apparatus of claim 5 wherein:

said connecting link is a pivoting link including a pair of links each having a pivoting end portion pivotably mounted to said mounting arm and a connecting end portion for receiving one of said bosses of said fixed trunnion fitting, said connecting link including a removable pin for securing said pair of links against pivoting movement relative to said mounting arm and wherein, said mounting arm further including a pair of corresponding holes for receiving said removable pin such that when received by said corresponding holes, said pin is positioned to interfere with said pivoting link to limit the range of motion of said pivoting link.

10. A method of mounting a soil leveling device to the mounting arm of a soil leveling attachment such that said soil leveling device may either be relatively strongly biased against upward movement or relatively unrestrained from upward movement, the method comprising:

(a) pivotably attaching a carrier arm to said mounting arm, said carrier arm for carrying said soil leveling attachment, (b) obtaining a connecting link having a pivot end portion and a connecting end portion and attaching said pivot end portion of said connecting link to said mounting arm, (c) providing a means for selectively either locking the position of said connecting link relative to said mounting arm or releasing said connecting link for pivoting movement relative to said mounting arm, (d) obtaining a spring member and connecting said spring member between said connecting end portion of said connecting link and said carrier arm, said spring member for resisting relative movement of said carrier arm toward said connecting end portion of said connecting link, such that at least initial upward movement of said carrier arm and said soil leveling device is resisted by said spring member when the position of said connecting link is locked and such that at least initial upward movement of said carrier arm and said soil leveling device is not resisted by said spring member when the position of said connecting link is not locked.

11. The method of claim 10, further comprising the step of:

(e) limiting the pivoting movement of said connecting link when said connecting link is not locked such that said spring member resists movement of said soil leveling device after an initial amount of movement of said soil leveling device.

\* \* \* \* \*